No. 773,730. PATENTED NOV. 1, 1904.
C. P. GERITZ.
VALVE.
APPLICATION FILED FEB. 19, 1904.
NO MODEL.
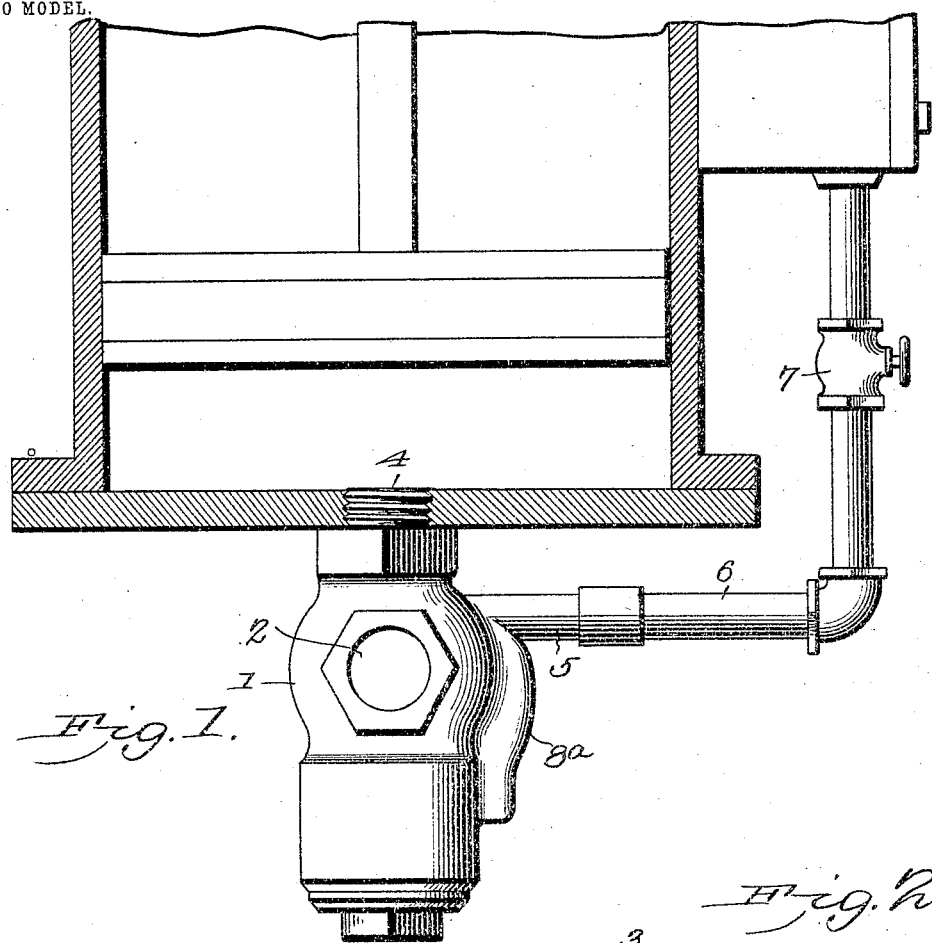
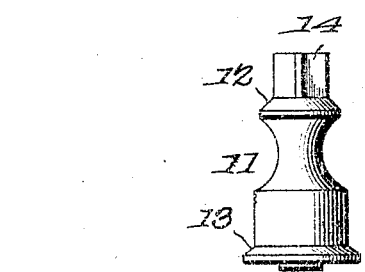
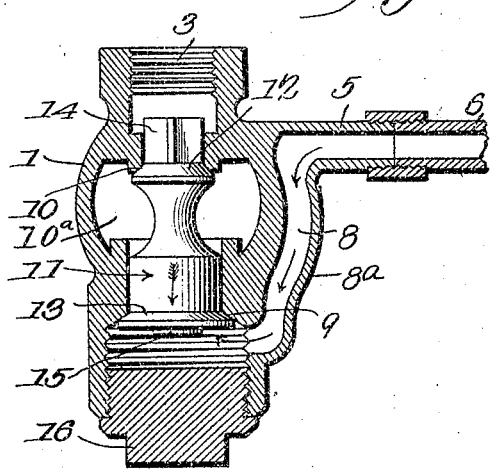
Witnesses
E. F. Stewart
R. M. Elliott
Claus P. Geritz, Inventor
by C. A. Snow & Co., Attorneys No. 773,730. Patented November 1, 1904.

UNITED STATES PATENT OFFICE.

CLAUS PETER GERITZ, OF KINGSLAND, NEW JERSEY, ASSIGNOR OF ONE-HALF TO VICTOR E. DOWNER, OF LINDHURST, NEW JERSEY.

VALVE.

SPECIFICATION forming part of Letters Patent No. 773,730, dated November 1, 1904.

Application filed February 19, 1904. Serial No. 194,399. (No model.)

*To all whom it may concern:*

Be it known that I, CLAUS PETER GERITZ, a citizen of the United States, residing at Kingsland, in the county of Bergen and State of New Jersey, have invented a new and useful Valve, of which the following is a specification.

This invention relates generally to relief-valves for steam-engines, and particularly to one combining the features of a drip and relief valve.

The object of the invention is in a ready, certain, and automatic manner to relieve the cylinders of a steam-engine of water of condensation or any entrained water that might result from boiler-priming during the operation of the engine, thereby positively eliminating all danger of injury to the cylinders, and, further, to free the cylinders of water when the engine is not in operation, thereby rendering unnecessary any attention by the engineer to this feature, which at present forms one of his very important duties.

While the device is defined as a relief-valve for use in engine-cylinders, it is to be understood that its scope of usefulness is not limited to this application alone, as it may be employed as a relief-valve on pump-pipes or in any other position where a relief-valve may be needed or used.

Generally stated, the invention embodies a casing adapted for connection with the cylinder of an engine, said casing containing a double-beat valve. The larger valve is disposed in the lower portion of the casing and is directly acted upon by steam from any suitable source, as from the steam-chest, and the smaller valve is disposed in the upper portion of the casing and is acted upon by the steam and water in the cylinder. The difference in the areas of the two valves is such that the steam-pressure on the larger valve will cause the smaller valve to resist the working pressure of the cylinder, and thus hold both valves firmly seated; but should the pressure on the upper valve become excessive, as from the presence of a slug of water in the cylinder, the valve will be unseated and permit the escape of the water. So long as the steam is on the cylinder the valves will remain seated, except under the conditions above stated, and will thus preclude escape of the steam; but as soon as the steam is shut off from the steam-chest the valve, under the action of gravity and the residual steam-pressure in the cylinder, automatically drops, and thereby frees the escape-port and permits any water in the cylinder to discharge. While gravity may be relied upon as the unseating agent for the valve, it is to be understood that, if preferred, a spring may be employed, and this will be more particularly true when the casing occupies a horizontal position, and as this is old and well known further description is deemed unnecessary. As a matter of further and specific improvement a valve may be combined with the steam-supply pipe connecting with the valve-casing, so that the supply of steam to the casing may at any time be cut off, and thus allow the valve to drop and free the cylinder of the water.

With the above and other objects in view, as will more fully appear as the nature of the invention is better understood, the same consists in the novel construction and arrangement of parts of the relief-valve, as will be hereinafter fully described and claimed.

In the accompanying drawings, forming a part of the specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in elevation exhibiting the relief-valve as combined with a vertically-disposed steam-cylinder. Fig. 2 is a vertical sectional view of the valve-casing, exhibiting the disposition of the different parts thereof and the arrangement of the valve. Fig. 3 is a detail view of the valve.

Referring to the drawings, 1 designates the valve-casing, provided at any suitable part, preferably at one side and near the top, with an escape-port 2, which may be a mere opening, as shown, or it may have combined with it a pipe leading to a suitable point of escape, the latter arrangement being adopted where the relief-valve is combined with an engine located in a building. The upper portion of the casing is provided with an internally-threaded neck 3, with which is connected in the usual manner a joint 4, designed to have a screw-threaded connection with the head of the engine-cylinder, although, if preferred, the neck may be screw-threaded, and thus dispense with the joint. As herein shown, the cylinder is of the vertical type; but it is to be understood that the invention is equally adaptable for use in connection with a horizontally-arranged cylinder, and as this will be readily understood detailed illustration thereof is deemed unnecessary.

Projecting from one side of the top of the casing and by preference integral therewith is a tubular extension 5, in this instance exteriorly threaded for connection with a steam-supply pipe 6, which leads to the steam-chest, or, if preferred, to the boiler, the said pipe being provided, if desired, with a valve 7, by which passage of steam to the valve-casing may at any time be cut off. The extension 5 constitutes, in effect, a continuation of a duct 8, which is formed in an offset $8^a$, preferably integral with the casing, and terminates beneath the lower valve-seat 9, the upper valve-seat 10 being in this instance shown as arranged practically in alinement with the lower wall of the extension 5, although it may be otherwise disposed, the casing between the two seats being formed into a chamber $10^a$, as usual.

The double-beat valve 11 is composed of two valves 12 and 13 of the usual construction, the intermediate portion of the valve-stem being reduced in order to permit free passage of water from above out through discharge-port 2. The upper end of the valve has the ordinary guide-flanges 14, and the lower portion of the valve has a teat or stud 15, which when no steam-pressure is on the device rests upon a plug or cap 16, secured in the lower portion of the casing. The teat or stud operates to hold the valve raised a sufficient distance when seated to insure passage of steam beneath the valve 12, thus to insure lifting.

It will be observed by reference to Fig. 2 that the transverse diameter of the valve 12 is less than that of the plug 16, and by this arrangement the valve as a whole may readily be removed when necessary by detaching the plug, thereby obviating the necessity of disturbing the casing in the event that a new valve has to be supplied.

All the parts of the device are constructed with a view to certainty of operation and durability in use, and when once assembled it will require no adjustment whatever and may be relied upon for operating positively, under all conditions, irrespective of the steam-pressure on the cylinder.

Having thus described the invention, what is claimed is—

1. A device of the class described comprising a casing having a chamber intermediate of its ends and a lateral duct discharging into the lower end of the casing, a double-beat valve having its valves of different diameters and adapted to engage valve-seats formed in the upper portion of the chamber and the lower end of the casing, and a detachable plug for closing the lower end of the casing.

2. A device of the class described comprising a casing having a chamber intermediate of its ends and a duct discharging into the lower portion of the casing, a double-beat valve having its valves of different diameters, and engaging seats in the upper portion of the chamber and the lower portion of the casing, a threaded extension in the lower portion of the casing, the internal diameter of which is greater than that of the larger valve, and a removable plug engaging the threaded extension.

3. A device of the class described comprising a casing having a chamber intermediate of its ends, and provided at its upper end with means for attachment to a cylinder, and at its lower end with an internally-threaded extension, and with a duct discharging into the extension, a double-beat valve having its valves of different diameter, the larger one of which is disposed in the bottom of the casing and is provided with a downward-extending teat, said latter valve being of less diameter than the internal diameter of the extension thereby to permit its removal when necessary, and a screw-threaded plug engaging the threaded extension and upon which the teat is adapted to bear to hold the valve sufficiently raised always to be operated upon by the steam to effect its lifting.

In testimony that I claim the foregoing as my own I have hereto affixed my signature in the presence of two witnesses.

CLAUS PETER GERITZ.

Witnesses:
CHARLES E. WILHELM,
OTTO E. R. SCHMIDT.